United States Patent

Ueda et al.

[11] Patent Number: 5,590,959
[45] Date of Patent: Jan. 7, 1997

[54] CONTINUOUS MIXER AND ROTOR SEGMENT REMOVAL TOOL FOR THE SAME

[75] Inventors: Hiroshi Ueda; Tsugushi Fukui; Kazuyoshi Imuta; Hirofumi Kimura; Shoji Yasuda; Shin Hotani; Kimio Inoue; Ryota Minato; Yoshimitsu Tanaka; Katsunori Takahashi, all of Takasago, Japan

[73] Assignee: Kabushiki Kaisha Kobe Seiko Sho, Kobe, Japan

[21] Appl. No.: 491,634

[22] Filed: Jun. 19, 1995

[30] Foreign Application Priority Data

Jun. 20, 1994 [JP] Japan .................................. 6-137653

[51] Int. Cl.⁶ ..................................................... B29B 1/10
[52] U.S. Cl. ............................................. 366/84; 366/322
[58] Field of Search ............................. 366/83, 84, 85, 366/86, 96, 97, 297, 298, 299, 300, 301, 318, 319, 321, 322, 323, 79, 88; 425/206, 207, 208

[56] References Cited

U.S. PATENT DOCUMENTS 4,332,481  6/1982  Inoue et al. .
4,334,785  6/1982  Blach .
4,416,544  11/1983  Blach ........................................ 366/85
4,624,577  11/1986  Vannier ...................................... 366/85
4,681,457  7/1987  Orimo et al. .
5,143,448  9/1992  Ueda et al. .
5,304,000  4/1994  Loomang et al. ...................... 366/301

FOREIGN PATENT DOCUMENTS 0271399  6/1988  European Pat. Off. .
0422475  4/1991  European Pat. Off. .
2325278  4/1977  France .
37 14 506  11/1988  Germany .

Primary Examiner—Robert W. Jenkins
Attorney, Agent, or Firm—Oblon, Spivak, McClelland, Maier & Neustadt, P. C.

[57] ABSTRACT

A continuous mixer in which the rotors used to mix the material are composed of a rotor shaft, and a plurality of rotor segments fitted onto said rotor shaft. The plurality of rotor segments can be removed from the shaft and replaced by rotor segments of differing specifications to produce a rotor of a different shape and specifications in accordance with any change in the kind of mixing conditions required.

7 Claims, 14 Drawing Sheets

CONTINUOUS MIXER AND ROTOR SEGMENT REMOVAL TOOL FOR THE SAME

DESCRIPTION OF THE PRIOR ART

A typical continuous mixer employed for the mixing-melting of polymeric materials such as synthetic resins etc. is shown in FIG. 17. This mixer comprises a barrel having a feed orifice at one end, a discharge orifice at the other end, and a vent hole located at an intermediate position. Two rotors 77 are parallely mounted for rotation within the barrel. Each rotor has two stages: a first stage comprising a first feed screw portion 78 for feeding the material along the barrel, a first mixing portion 79 for effecting the melting-crushing of the material, and a gate portion 80 for controlling the degree of mixing; and a second stage comprising a second feed screw portion 81 for the feed and degassing of the material, and a mixing-discharge portion for effecting further mixing and discharge of the material. These portions are arranged in the above order in the direction of the axis of the rotor.

The rotors form a single unit with the rotor shaft, and when the rotors are to be replaced, the barrel 76 is forwardly displaced to expose the rotors 77. This kind of mixer, as well as its single stage equivalent, are also used to effect gel elimination in addition to mixing of the material.

In recent years, plastic materials have diversified in type with some materials requiring only gentle mixing to avoid thermal degradation, such as straight chain low density polyethylene (L-LDPE), and other materials, for which a high degree of dispersivity is demanded and therefore requiring strong mixing, such as high density polyethylene (HDPE). There is therefore a demand for a single mixer which can perform a whole range of mixing operations, from gentle mixing to strong mixing.

However, with the above-described type of mixer in which the rotors form a single integrated unit with their respective rotor shafts, when it comes to changing the rotors in accordance with a change in the type of material to be mixed, not only is it necessary to replace the whole rotor unit for one having the desired chip clearance, blade length ratio (ratio of the lengths of the feed blade and the mixing blade), mixing blade length etc. (thus requiring the preparation in advance of many rotor units each corresponding to a certain material), it is also necessary to replace a complete set of components comprising the bearings which support the rotor shaft, drive transmission gears etc. In practice, it is difficult to prepare a complete set of rotor units ideally suited to each material.

The present invention was made in light of the above-described problems in the prior art, and has as its objective the provision of a continuous mixer in which the shape of the rotors, described by several factors including chip clearance, blade length ratio, mixing blade length, screw angle of the blade, continuous/discontinuous, presence of supplementary stages (i.e. second, third stages etc.), number of chips of blade, can be changed in accordance with the particular requirements of a material to be mixed, and the provision of a tool for effecting the removal of rotor segments.

SUMMARY OF THE INVENTION

The continuous mixer according to the present invention comprises: a barrel having a feed orifice at one end and a discharge orifice at the other end; and a pair of rotors parallely mounted for rotation inside the barrel; wherein each of the rotors comprises a rotor shaft, and a plurality of rotor segments fitted onto the rotor shaft.

When the rotors are exposed from within the barrel, the various rotor segments can be removed from the rotor shaft, and new segments can be fitted onto the rotor shaft to create a new rotor having a new shape and specifications (i.e. chip clearance, blade length ratio, mixing blade length, screw angle etc.) ideally suited to the particular material to be mixed. In other words, the shape of the rotors can be changed easily in accordance with the kind of mixing conditions required simply by replacing the rotor segments, making it possible to realise a reduction in cost etc.

Various means can be employed to engage the rotation of the rotor shaft to the rotor segments. According to one embodiment of the present invention, the rotor shaft has splines extending in the axial direction formed on the outer circumferential surface thereof, and each rotor segment has grooves formed on the circumferential inner surface thereof to engage with these splines. With this structure, the rotational torque of the rotor shaft can be effectively transmitted to the rotor segments.

According to another embodiment of the present invention, the rotor segment closest to the base portion of the rotor shaft is engaged with the rotor shaft, and neighbouring segments are engaged with each other, through the engagement of projections protruding from the radial surface of one and matching holes formed on the radial surface of the other. The rotor shaft in this case has a larger effective radius and hence greater strength compared to the splined shaft described above, and it is sufficient to consider only the bending stress, with no need to consider the stress concentration. Thus, high torque mixing can be realised, the shaft structure is simplified, and maintenance of the shaft such as machining and cleaning etc. is greatly simplified.

It is preferred that a male screw be formed on the circumferential surface of the base portion of the rotor shaft adjacent to that portion of the surface upon which the first rotor segment is fitted; and that a member having an internal screw thread (female screw member) be screwed onto this male screw so as to contact the radial surface of the first rotor segment fitted adjacent thereto. Then if the rotor shaft is rotated whilst preventing the female screw member from rotating, the female screw member is displaced axially towards the end of the rotor shaft, thereby pushing the rotor segments in the same direction. This action frees the rotor segments from hardened resin to facilitate the removal of the rotor segments from the rotor shaft. Thus the removal operation can be completed in a short period of time, and there is no need to employ elaborate equipment or tools such as a hydraulic cylinder to effect the removal operation.

According to a preferred embodiment of the present invention, at least one of the rotor segments fitted onto the rotor shaft is a mixing segment; a gate segment is fitted onto the rotor shaft immediately after the mixing segment; and a gate is positioned around the gate segment.

It is further preferred that the passage formed between said gate segment and said gate has a ring shaped cross-section of uniform radial width.

By adjusting the opening of the gate positioned around the gate rotor segment, the degree of mixing can be finely adjusted. For example, in the case of gel elimination, which requires strong mixing, the gate can be throttled to reduce the area of the passage through which the material passes, by which the material receives a strong shear action and gel elimination is effected smoothly. It is to be noted that with the mixer of this invention it is also possible to adjust the size of the gate passage by setting the gate to its most throttled position and then replacing the gate segment for another of appropriate size.

It is also preferred that a seal mechanism be formed between neighbouring rotor segments. This seal mechanism prevents the penetration of molten material into the space between the rotor segments, thereby making it possible to prevent the corrosion of the rotor shaft. This facilitates the operation of dismantling the rotor and replacing the rotor segments, and also eliminates the necessity to use a rotor shaft made of a corrosion resistant material.

According to one embodiment of the present invention, the mixer further comprises a water end stop positioned at the end of the barrel and having a seal chamber through which the rotor shaft passes; a seal sleeve fitted onto the portion of the rotor shaft passing through the seal chamber, wherein one portion of the inner circumferential surface of the seal sleeve engages with the outer surface of the rotor shaft, and a second portion of the inner circumferential surface of the seal sleeve is separated by a certain distance from the outer surface of the rotor shaft; a male screw formed on the portion of the outer surface of the rotor shaft separated by a certain distance from the seal sleeve; and a locking member having an internal screw thread screw fitted onto the male screw in the space between the inner circumferential surface of the seal sleeve and the outer circumferential surface of the rotor shaft.

The rotor segment removal tool for removing rotor segments from the rotor shaft of a mixer according to the present invention comprises a rotor segment support unit for accommodating a rotor and having a plurality of bolt holes formed therein; a plurality of segment securing bolts screwed into the bolt holes to directly contact and support a rotor segment of a rotor when positioned within the support unit; and means for pushing in an axial direction the rotor shaft of a rotor when supported in the support unit.

The operation of replacing the rotor segments using the rotor segment removal tool according to the present invention can be effected most effectively using a pair of the segment removal tools and first requires axially displacing the barrel of the mixer to expose the rotors. Then the support unit is fitted around each of the left and right rotors, and the segment securing bolts are used to securely clamp that rotor segment closest to the tip of the rotor. Next, the means for axially pushing the rotor shaft in an axial direction such as a hydraulic cylinder, is employed to push the rotor shaft in an axial direction, whereby the rotor segment securely clamped by the segment securing bolts is displaced relative to the rotor shaft in a direction towards the tip of the rotor shaft, to thereby remove the rotor segment. This procedure is then repeated for the next rotor segment, and further repeated until all the rotor segments have been removed.

DESCRIPTION OF THE EMBODIMENTS

Figure 1:
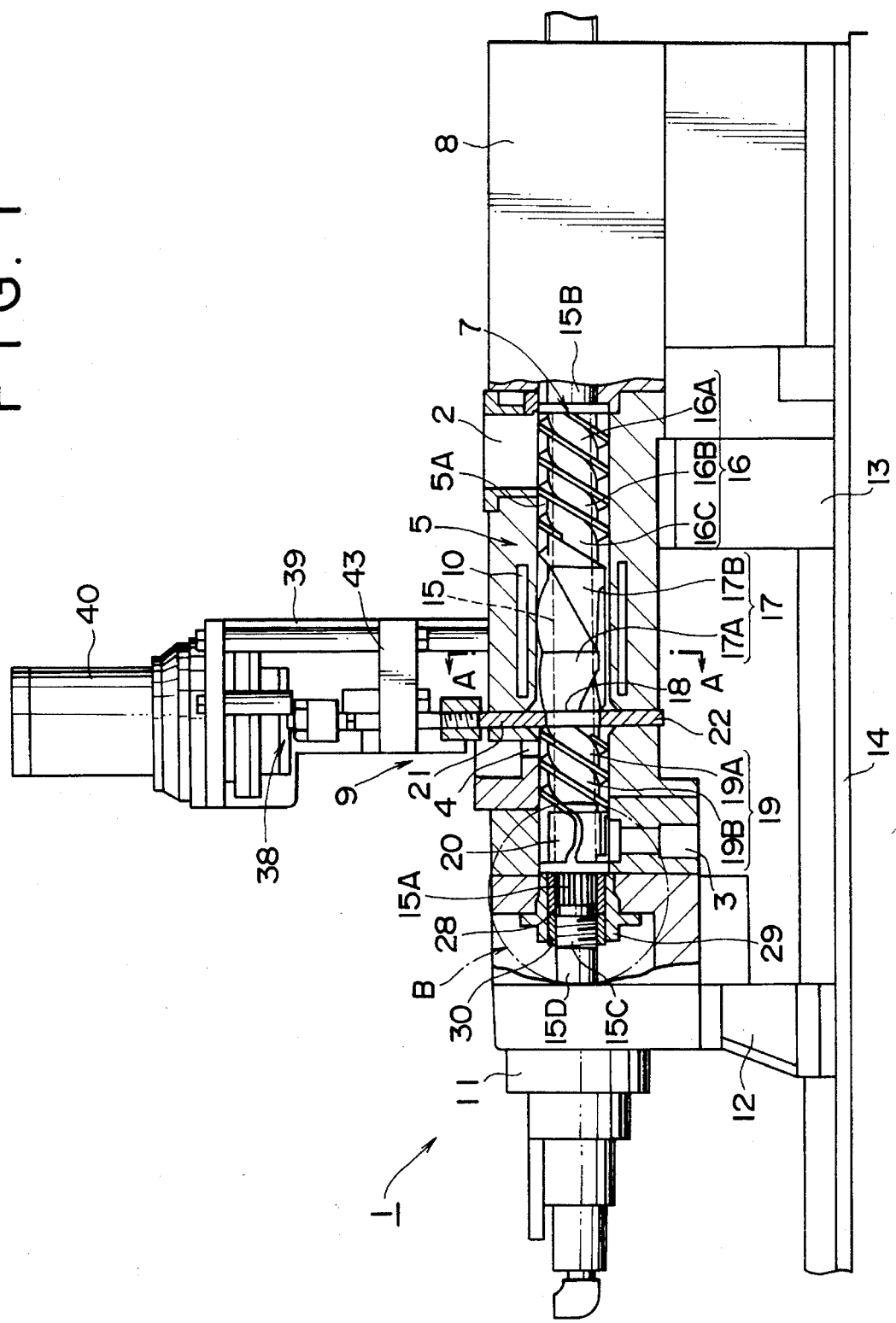
FIG. 1 is a cut away view of the main components of the mixer according to a first embodiment of the present invention.

Embodiments of the present invention will be described hereunder with reference to the accompanying Figures.

FIGS. 1–7 show a first embodiment of the present invention. Mixer 1 comprises a barrel 5 having a feed orifice 2 at one end, a discharge orifice 3 at the other end, and a vent hole 4 located at an intermediate position. A pair of left and right chambers 5A are parallely arranged within the barrel, and are interconnected along approximately their entire length by link passage 6. A pair of rotors 7 are arranged in the chambers 5A for rotation in opposite directions. The rotation of the rotors is driven by drive means 8. The mixer also comprises a mixing degree adjustment mechanism 9.

Within the body of the barrel 5 are provided passages 10 for the flow of a medium, eg. water, for controlling the temperature of the material being mixed. A water end stop 11 is connected to the end of barrel 5. Support legs 12 and 13 are respectively provided on the water end stop 11 and portion of the barrel opposite the feed orifice 2, and these legs are used to support the barrel 5 and water end stop 11 for displacement in a direction parallel to the axes of the rotors 7.

Figure 7:
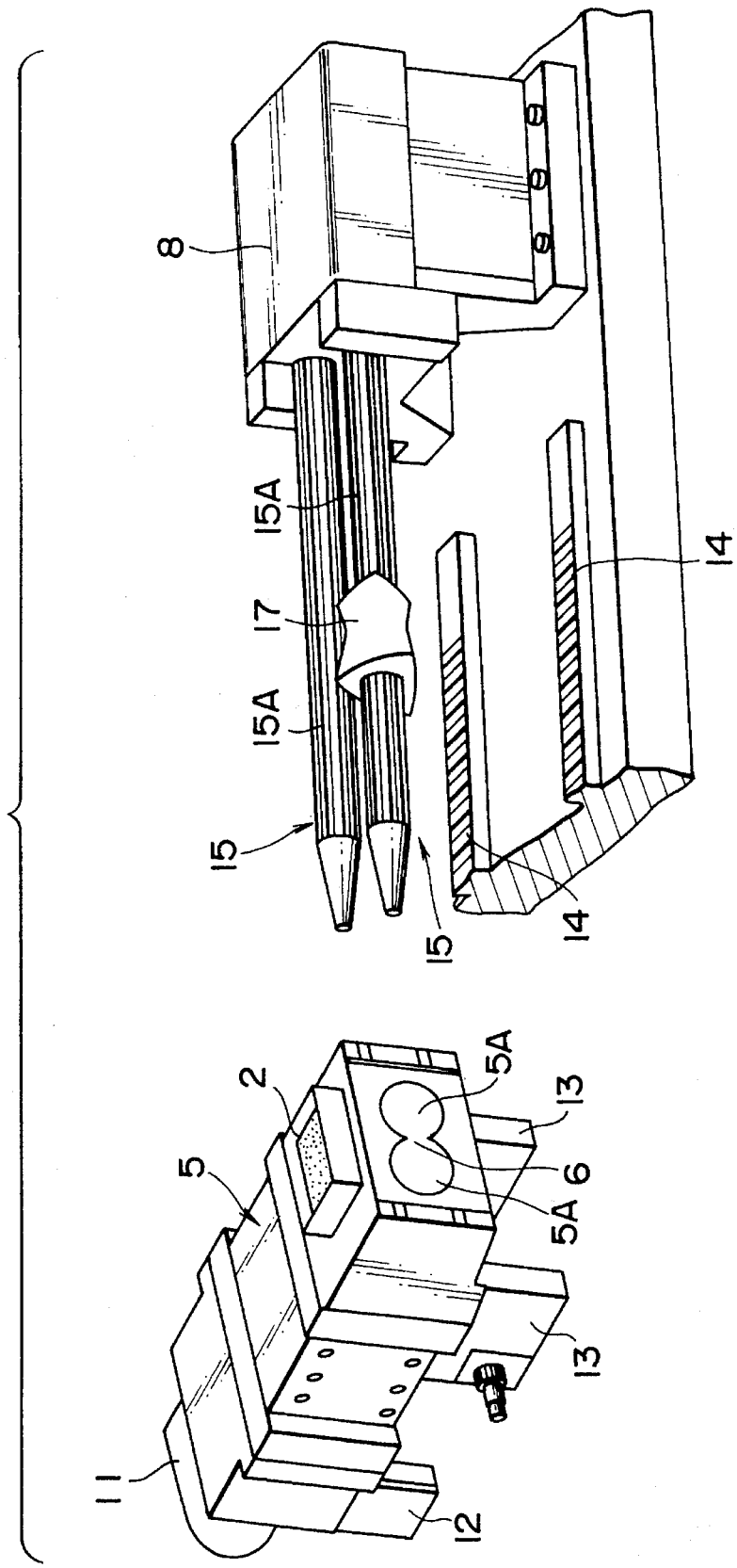
FIG. 7 is a view of the rotors withdrawn to a position outside the barrel.

The barrel 5 (and water end stop 11 ) may thus be axially displaced with respect to the rotors 7 to expose the rotors 7 as connected to their drive mechanism 8, and in such an exposed condition, as shown in FIG. 7, the shape and dimensions of the rotor can be changed.

The rotors 7 comprise a rotor shaft 15 having a base portion 15B connected to the drive mechanism 8. With the exception of this base portion 15B, the outer circumferential surface of the rotor shaft 15 has splines 15A formed thereon. Various kinds of rotor segments such as a first feed screw segment 16, first mixing segment 17, gate segment 18, second feed screw segment 19, second mixing discharge segment 20, are fitted onto the rotor shaft 15 to engage with the splines 15A.

The first feed screw segment 16 is divided into three segments 16A, 16B and 16C; the first mixing segment is divided into a feed blade segment 17A and return blade segment 17B ( and in some cases an additional straight segment); and second feed screw segment is divided into two segments 19A and 19B.

For each of the segments 16–20 mentioned above, several kinds are prepared differing in their specifications such as tip clearance, blade length ratio (ratio of lengths of feed blade and return blade), mixing blade length, screw angle (eg. 0°, 30°, 60° etc), continuity/discontinuity of blade, number of mixing stages (eg. 1 stage mixing, 2-stage mixing, 3-stage mixing, 4 stage mixing), number of tips of mixing blade etc. in accordance with the differing requirements of different materials. Each rotor segment has a central hole of a size and shape appropriate for engagement with the splines 15A of rotor shaft 15.

Gate segment 18 has a cylindrical shape, and a gate segment 18 of a certain radius can be selected to alter the minimum clearance of the passage 23 formed between the gate segment 18 and upper and lower gates 21, 22, making it possible to finely adjust the degree of mixing. Also, in the case of gel elimination, for which strong mixing is required, the upper and lower gates can be throttled to narrow the passage 23 and thereby apply a strong shear action to the material being mixed when it passes through the passage 23, making it easier to effect gel elimination.

Figure 2:
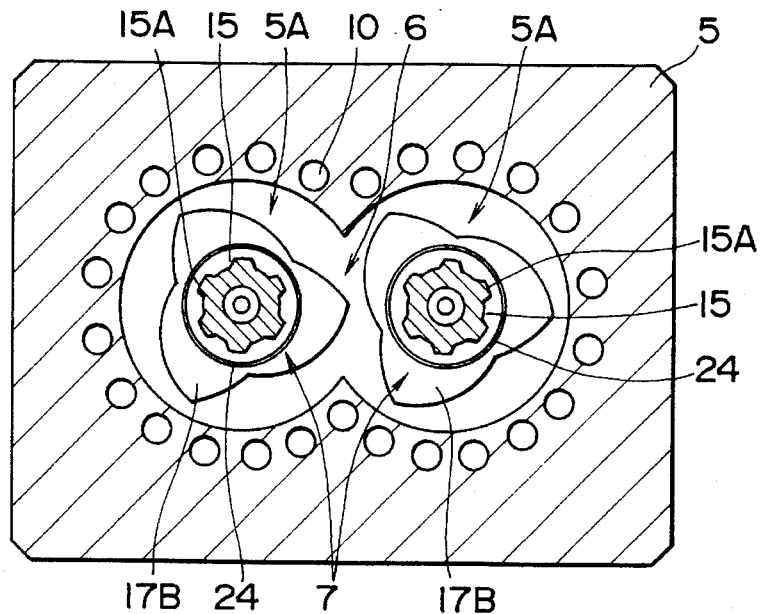
FIG. 2 is an enlarged view of a cross-section marked by A—A in FIG. 1.
Figure 3:
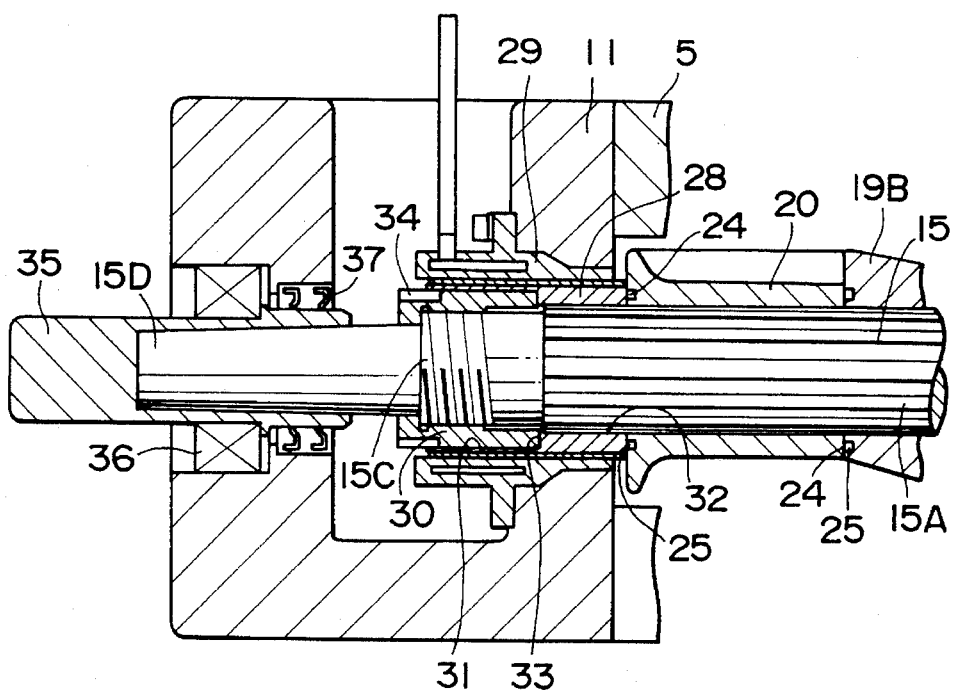
FIG. 3 is an enlarged view of the area marked B in FIG. 1.

As shown in FIGS. 2 and 3, a groove 24 is formed on one or both of the radial surfaces of each of the rotor segments 16–20, and a seal ring 25 is fitted into this groove to constitute a seal mechanism. This seal mechanism prevents the penetration of molten material between the rotor segments to the splines 15A (where it might otherwise collect and harden) thereby facilitating the replacement of the rotor segments.

Figure 4:
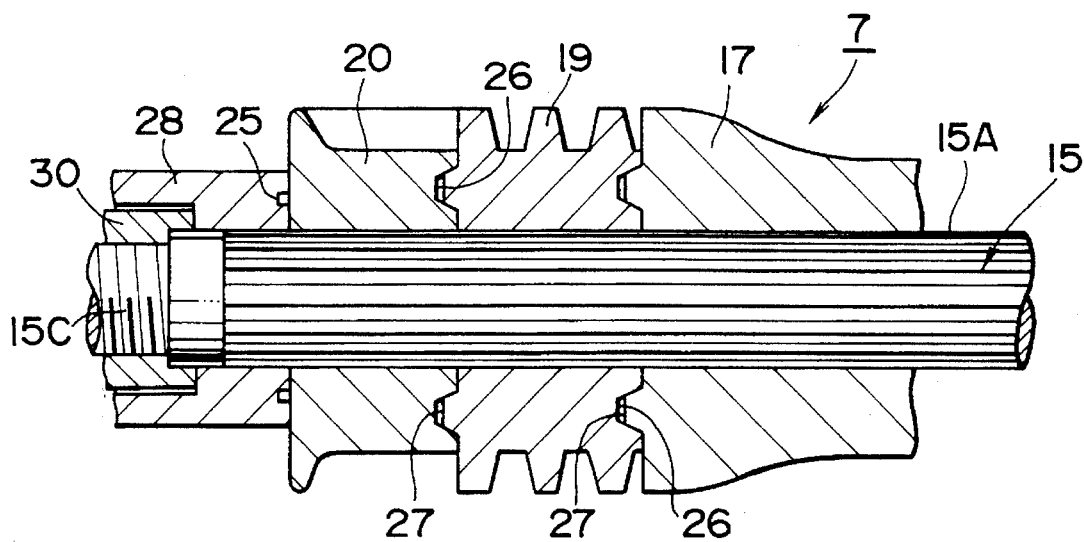
FIG. 4 is an enlarged view of an inter-segment seal mechanism suitable for use in a mixer according to the present invention.
Figure 5:
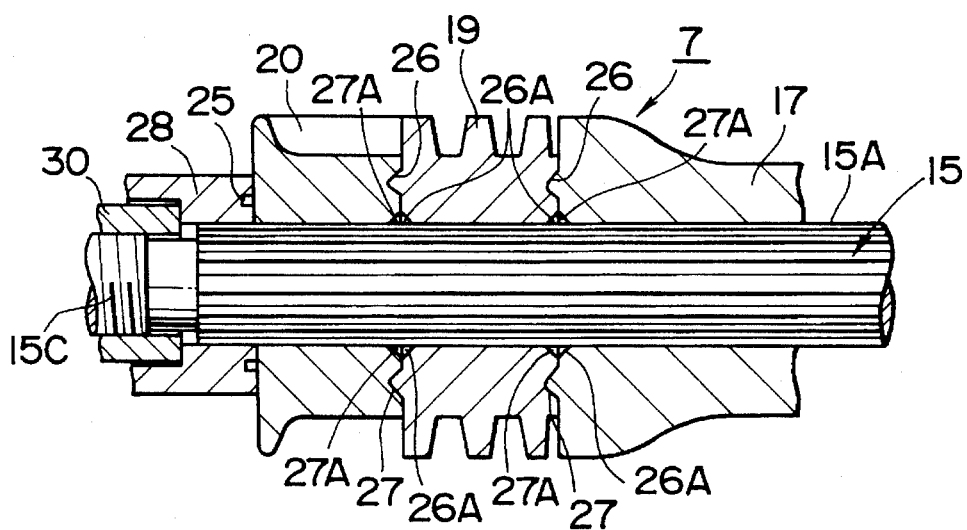
FIG. 5 is an enlarged view of another inter-segment seal mechanism suitable for use in a mixer according to the present invention.

It is also possible to construct a seal mechanism by, as shown in FIGS. 4 and 5, forming an annular groove 26 and matching annular projection 27 on the radial surfaces of neighbouring rotor segments. It is preferred that a tapered groove 26A be formed on the radially central portion of the radial faces where segments 17 and 19, and segments 19 and 20, join, and that an O-ring be inserted into the space defined by these grooves 26A and the surface of rotor shaft 15 to effect sealing.

The shaft sleeve mechanism provided where the end of rotor shaft is supported by water end stop 11 is shown in FIG. 3. It comprises a Viscoseal shaft sleeve 28 fitted onto and engaging with the splines 15A of rotor shaft 15; a Viscoseal chamber 29 formed in water end stop 11; and a cylindrical locking member 30 (having an internal screw thread) for securing the Viscoseal shaft sleeve 28. The portion of the rotor shaft 15 extending from the splined portion consists of a screw portion 15C and a tapered portion 15D in that order.

The portion of the shaft sleeve 28 closest to the tip of the rotor shaft 15 has an increased internal radius to thereby create a space 31 between this portion of the shaft sleeve 28 and the screw portion 15C of the rotor shaft 15. The inner circumference of the second mixing discharge segment 20 has grooves matching the splines 15A of rotor shaft 15 to engage therewith, and a seal ring is provided between rotor segment 20 and shaft sleeve 28. Locking member 30 is screwed onto screw portion 15C of rotor shaft 15 in the space 31 between shaft sleeve 28 and rotor shaft 15, and its radial surface contacts the step 33 formed on the inner circumferential surface of shaft sleeve 28 to thereby secure and clamp rotor segments 16–20 via shaft sleeve 28.

As shown in FIG. 3, locking member 30 has a slot formed thereon to which a tool, for rotating to tighten or loosen locking member 30, may be fitted. The tapered portion 15D of rotor shaft 15 is freely inserted into bearing sleeve 35, and is supported for rotation by water end stop 11 via bearing 36. 37 denotes a seal component.

By employing the above-described shaft sleeve structure, in which locking member 30 is fitted inside shaft sleeve 28, a seal between the water end stop 11 and rotor shaft can be ensured without the need to increase the length of the rotor shaft 15 (by the length of locking member 30). Furthermore, the penetration of molten material to the splines 15A can be prevented, thereby facilitating, and reducing the time required for, the operation of dismantling the rotor 7 and replacing the rotor segments. Since shaft sleeve 28 engages with splines 15A, rotation with respect to locking member 30 during operation of the mixer is prevented, thereby preventing the locking member 30 from being screwed on any tighter than its fitted condition, and facilitating the loosening of the locking member 30. When the segments are to be replaced, barrel 5 together with water end stop 11 are axially displaced away from the drive mechanism 8, whereby tapered portion 15D is withdrawn out of bearing sleeve 35, and shaft sleeve 28 slides out of seal chamber 29 to leave the rotors exposed. Then locking member 30 is unscrewed from screw portion 15C of rotor shaft 15 and shaft sleeve 28 may then be slid off of rotor shaft 15 followed by rotor segments 16–20, as shown in FIG. 7.

Figure 6:
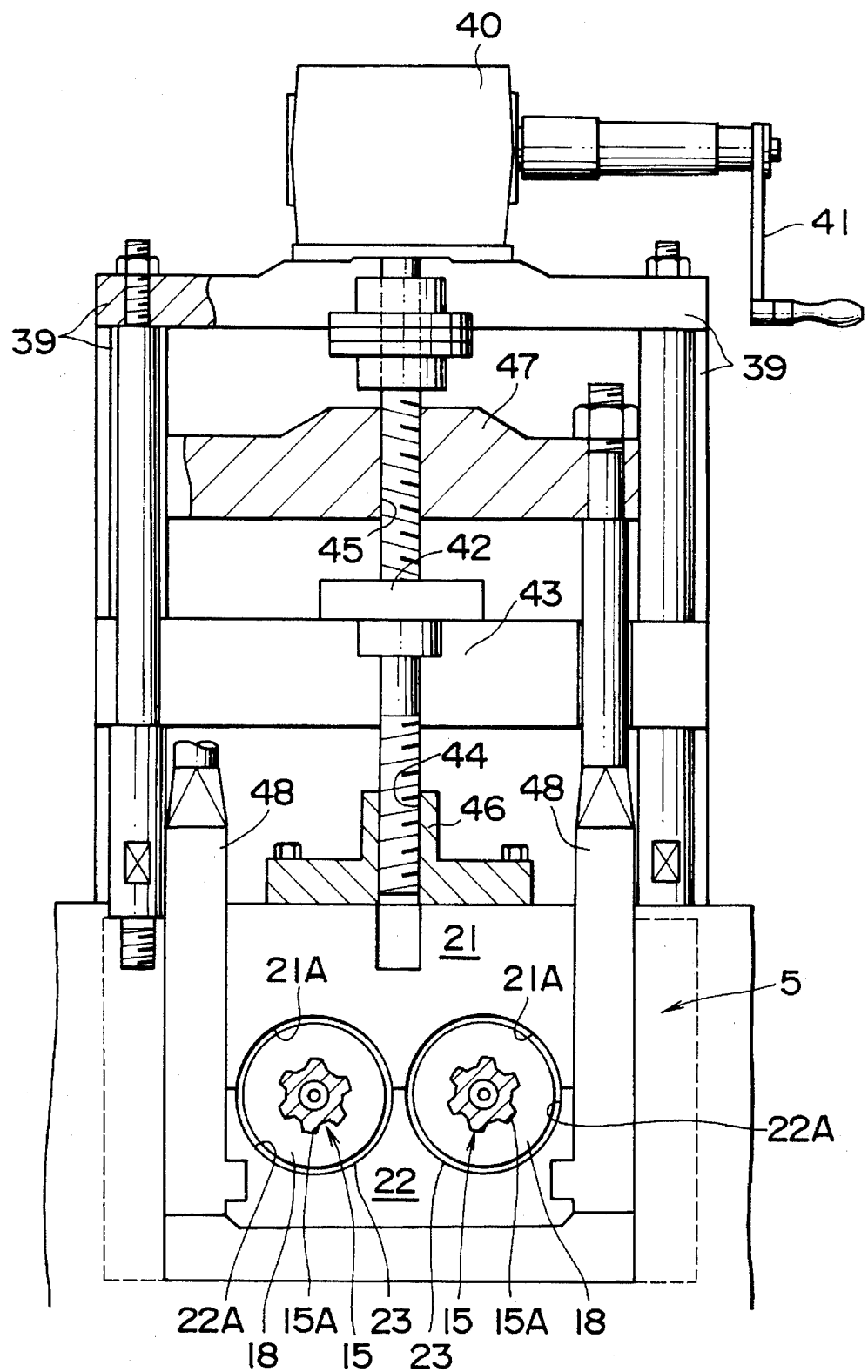
FIG. 6 is a vertical cross-sectional view of the gate section of the embodiment shown in FIG. 1.

As shown in FIG. 6, gates 21, 22 each comprise a plate having a pair of left and right semicircular indentations 21A, 22A formed therein. These are arranged one above the other such that corresponding left and right semicircular indentations 21A, 22A face each other and together form cylindrical holes when the gates 21, 22 are brought together. The gates 21, 22 are arranged in a position within the barrel corresponding to the position of the gate segment 18 of rotors 7 such that a ring shaped passage 23 is formed between the gates 21, 22 and the gate segment 18. The gates 21, 22 can be opened and closed by moving the gates 21, 22 in opposite directions, thereby making it possible to alter the clearance of passage 23. As shown in FIG. 6, gate opening/closing drive means 38 comprises: a door-frame shaped support frame 39 erected on barrel 5; a manually operated handle 41 and gear box 40 mounted on the top of support frame 39; a spindle 42 suspended vertically from the gear box 40; a beating unit 43 secured to the left and right sides of support frame 39 for providing lateral support to a center portion of the spindle 42; a pair of blocks 46, 47 connected respectively to upper and lower gates 21, 22 and having a pair of female screws 44, 45 of opposite hand screw formed respectively therein; and link 48 connecting unit 47 to lower gate 22.

Spindle 42 has a left hand male screw 42A formed on the outer circumferential surface of the upper portion thereof, and a right hand male screw 42B formed on the outer circumferential surface of the lower portion thereof. These male screws engage with female screws 44, 45 of blocks 46, 47 respectively. Then, if handle 41 is turned in a left or right direction, the spindle 42 will rotate in a left or right direction, and the blocks 46, 47 will be displaced vertically in opposite directions, whereby the gates 21, 22 are displaced vertically in opposite directions.

Figure 8:
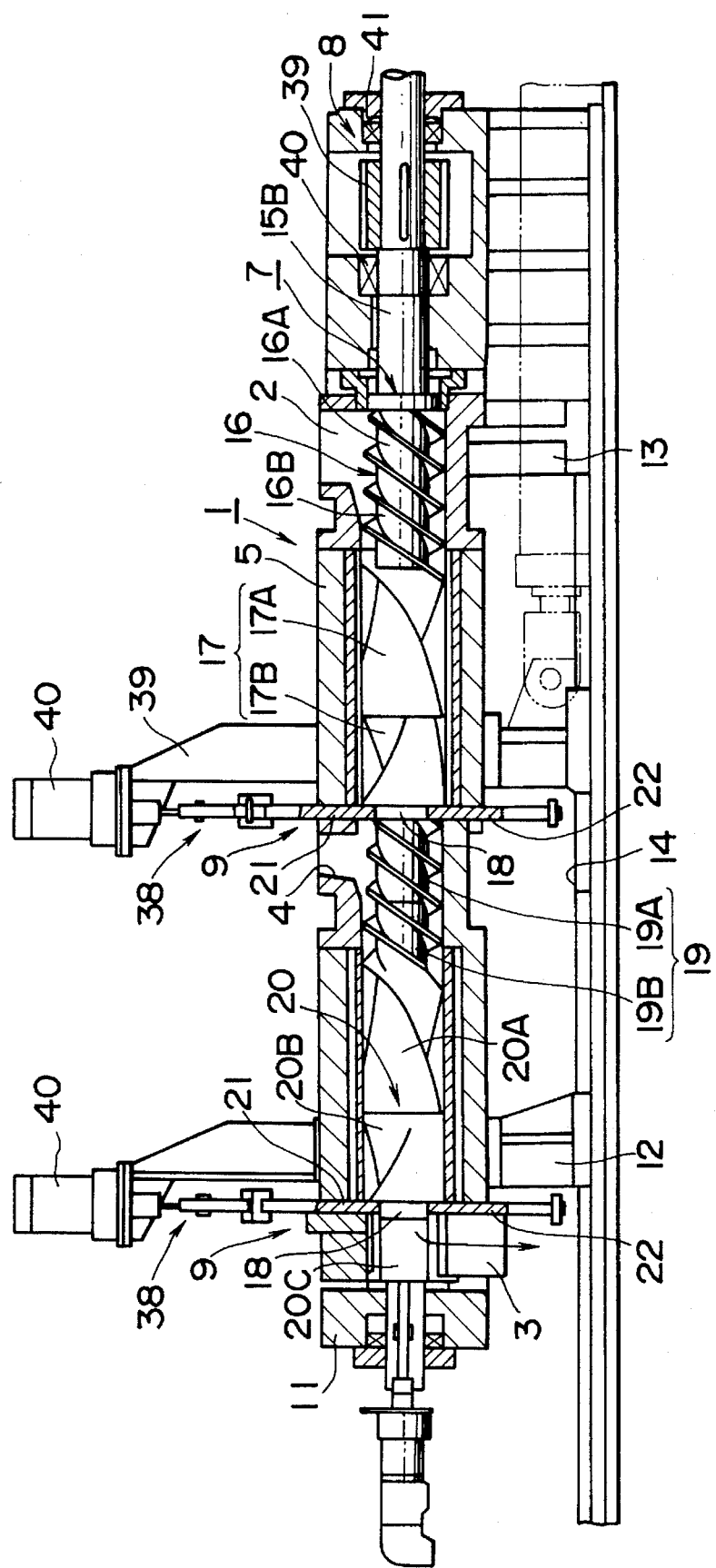
FIG. 8 is a cut away view of a mixer according to a second embodiment of the present invention.

FIG. 8 shows a second embodiment of the present invention. It differs from the first embodiment in that the second mixing discharge segment 20 is composed of three separate segments 20A, 20B and 20C, and in that a second gate segment 18 is added between segments 20B and 20C, to provide an additional mixing degree adjustment mechanism 9. The mixing action can be controlled over a wider range compared to the first embodiment.

The two mixing degree adjustment mechanisms 9 are identical to that used in the first embodiment, and therefore a detailed explanation shall be omitted, and the same reference numerals used to designate identical components. In FIG. 8, 39 denotes a gear secured onto the base portion 15B of rotor shaft 15, and 40, 41 denote bearings. The base portion 15B of one of the rotors 7 is connected to a drive mechanism (not shown). In each of the above-described embodiments, the rotors 7 are supported for rotation at both ends. However, it is also possible to apply this invention to the type of mixer in which only the base portion of the rotor is supported for rotation, in which case the operation to expose the rotors from within the barrel 5, prior to dismantling of the rotors and replacement of the rotor segments, is further facilitated.

Figure 9:
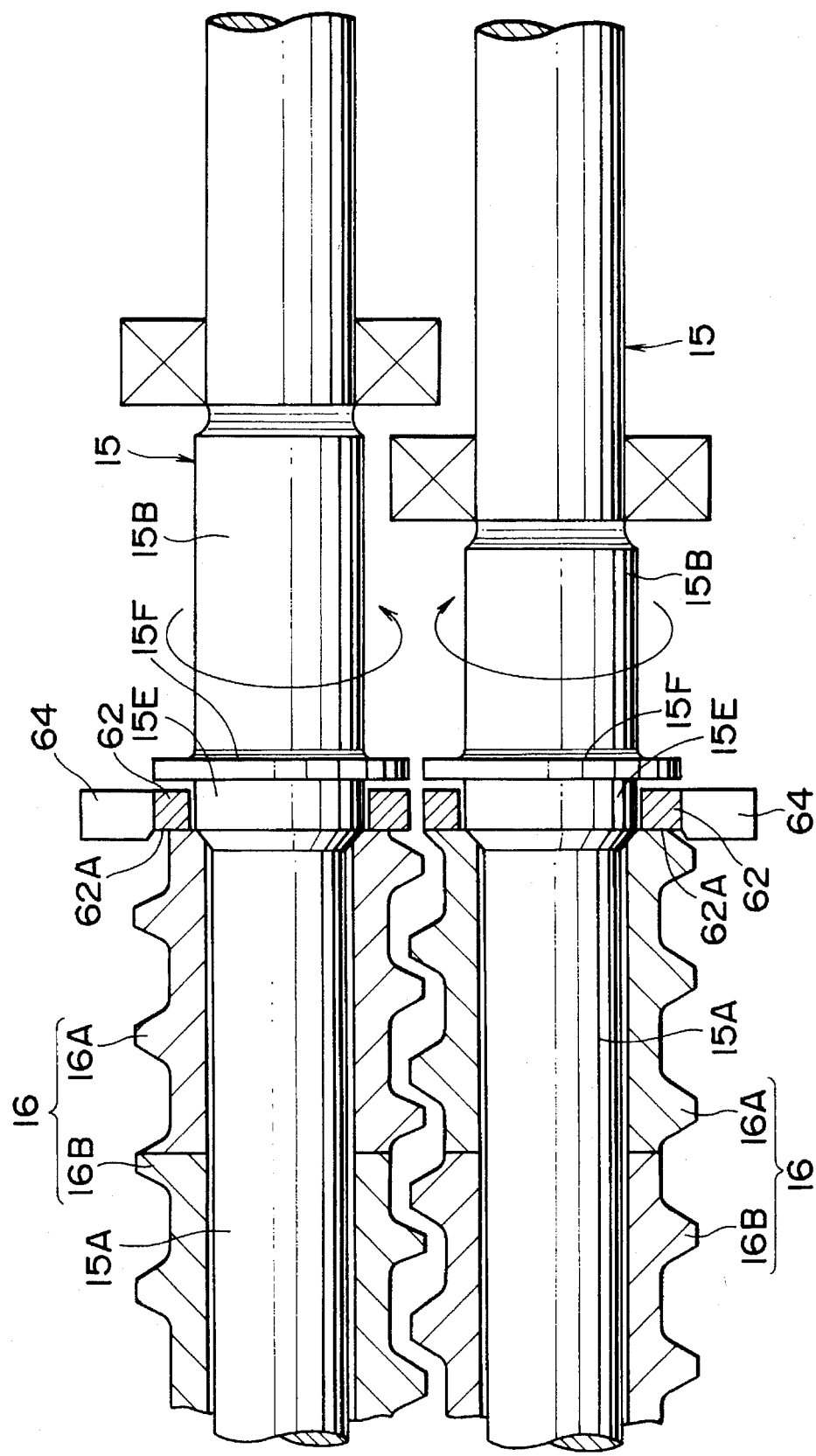
FIG. 9 is an enlarged view of the base portion of the rotor according to a third embodiment of the present invention.
Figure 10:
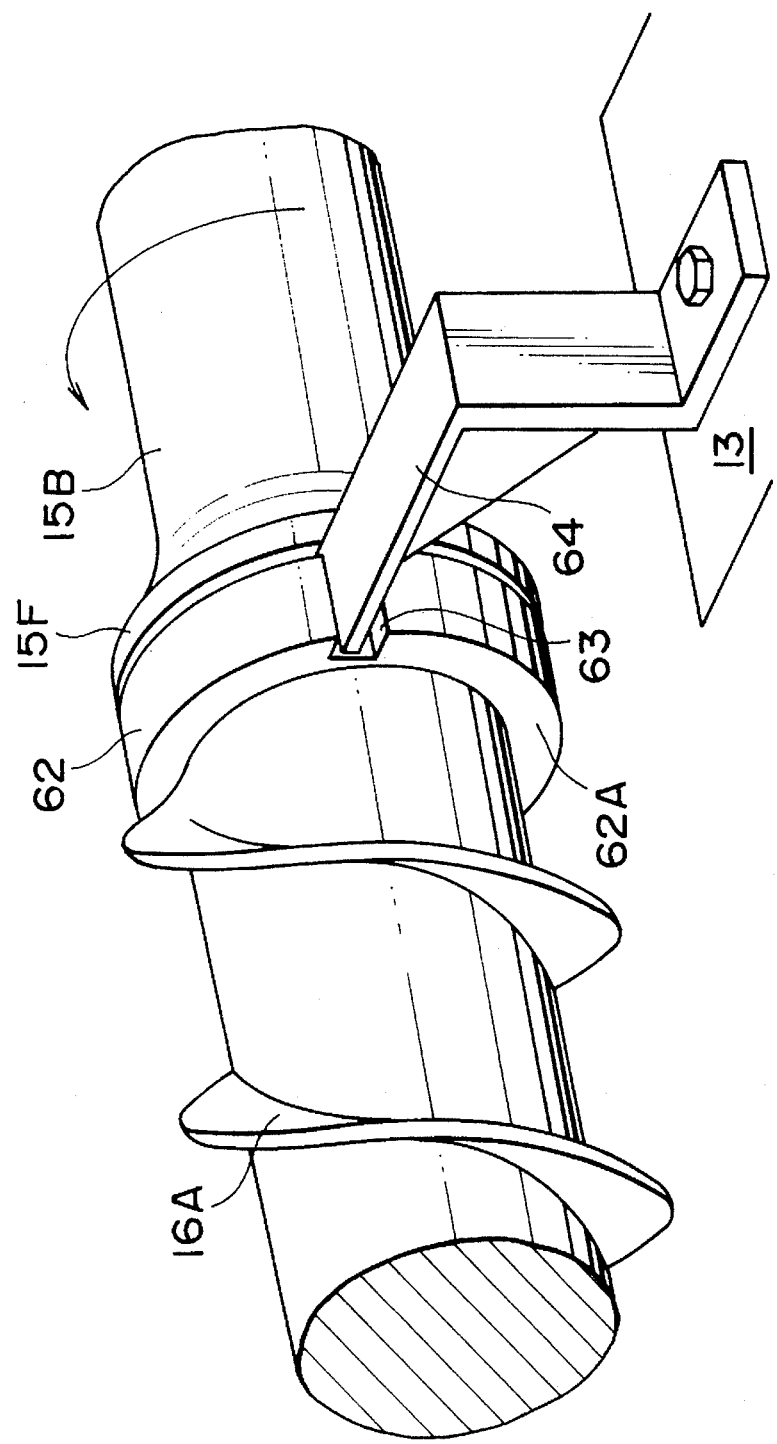
FIG. 10 is a view of the mechanism used in the removal of rotor segments from their shaft according to a third embodiment of the present invention.

FIGS. 9 and 10 show a third embodiment of the present invention. This third embodiment differs from the first two embodiments in that a male screw 15E is provided on the outer circumferential surface of the portion of the rotor shaft 15 located on the rotor tip-side of flange 15F which is itself located between the splined portion 15A and base portion 15B of rotor shaft 15. A female screw member 62, such as a nut, is screwed onto this male screw 15E, and its rotor tip-side radial face contacts with the rotor base-side radial face of first rotor segment 16A.

This female screw member 62 rotates with the rotor shaft 15 in normal operation. However, when it comes to replacing rotor segments 16–20, then as shown in FIG. 10, the end of a stopper 64 mounted on support leg 13 is inserted into a slot 63 formed in the outer circumferential surface of female screw member 62 to prevent the rotation of female screw member 62. Then, if the rotor shaft 15 is rotated in the direction for loosening the female screw member 62, the female screw member is axially displaced towards the tip of the rotor shaft 15, whereby the rotor segments are forcibly displaced towards the tip of the rotor shaft 15.

As a result, any resin hardened on the inner circumferential surface of the barrel 5 is dislodged, to thereby facilitate the removal of segments 16–20 and enable an operator to perform the operation by hand. Also, in this third embodiment, if the outer circumferential surface of the female screw member is shaped to receive a tool such as spanner, then the operation of forcibly displacing the rotor segments towards the tip of the rotor shaft 15 to facilitate their removal can be effected by applying such tool to the outer circumferential surface of the female screw member 62 and rotating the female screw member therewith, whilst securing the rotation of the rotor shaft 15.

Figure 11:
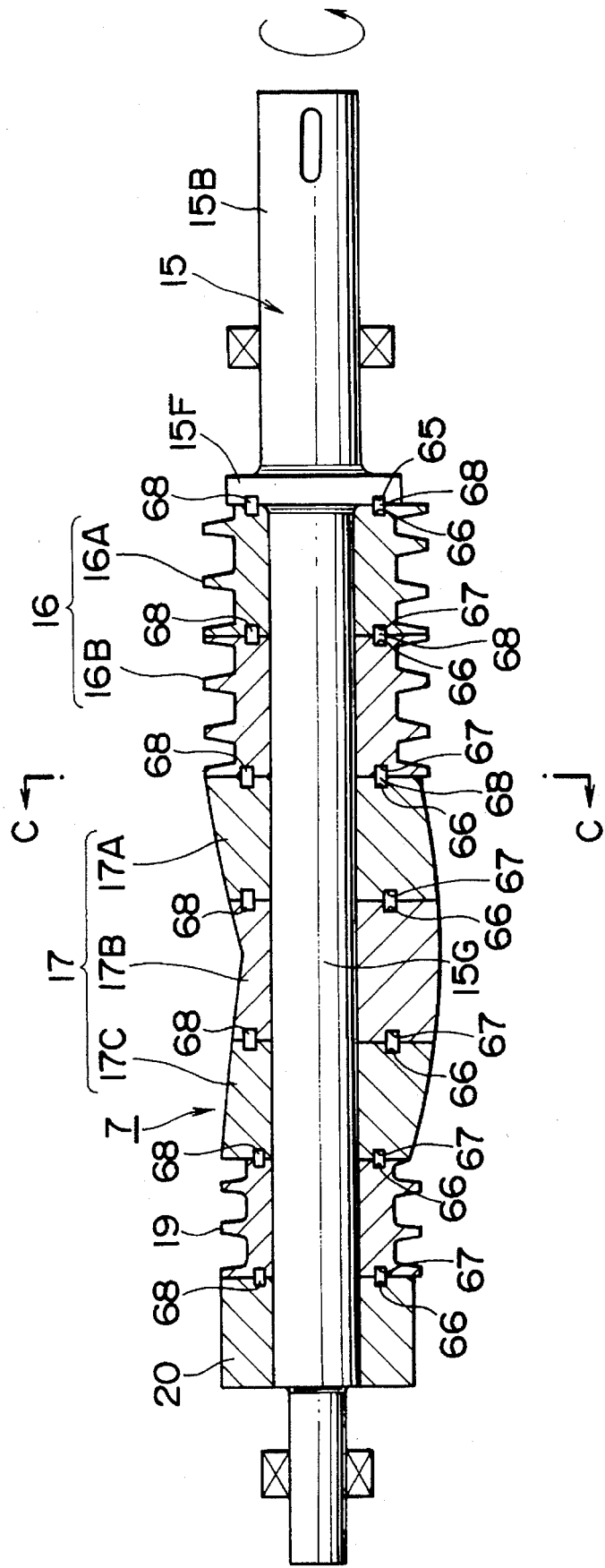
FIG. 11 is a view of a rotor of a mixer according to a fourth embodiment of the present invention.
Figure 12:
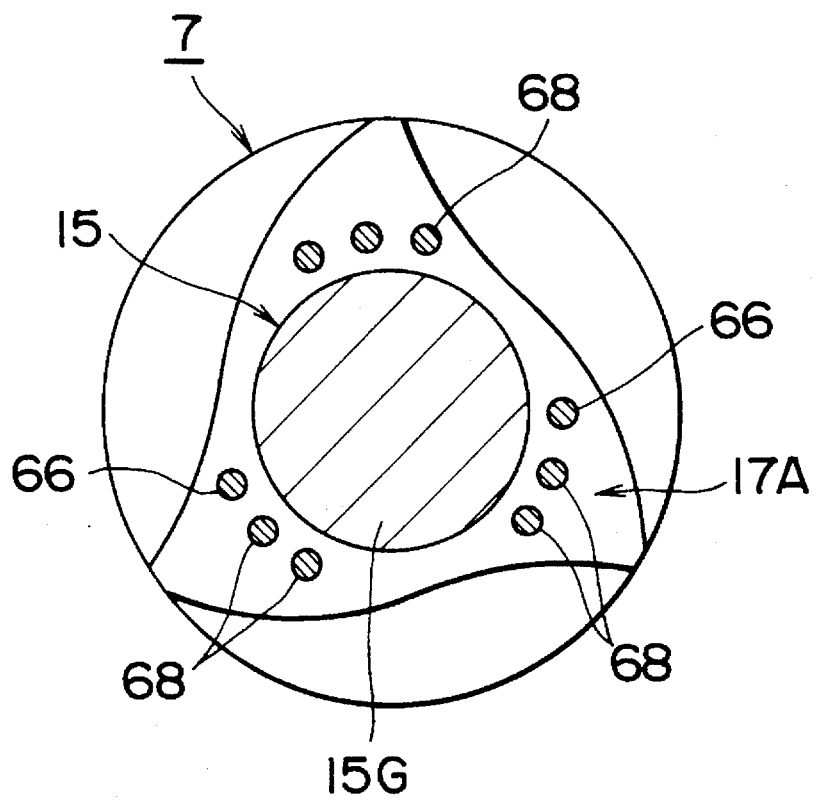
FIG. 12 is an enlarged view of the cross-section marked C—C in FIG. 11.
Figure 13:
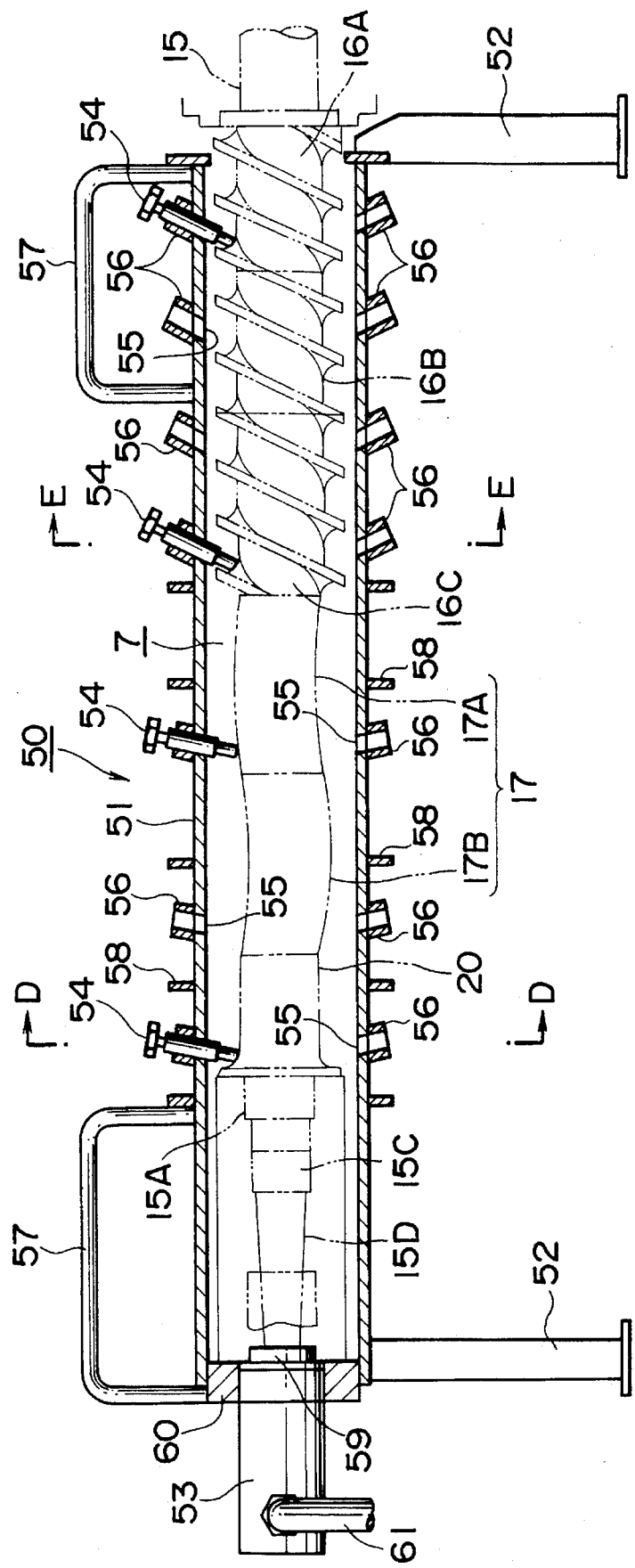
FIG. 13 is a vertical cross-sectional view of an embodiment of the rotor segment removal tool as fitted to a rotor.
Figure 14:
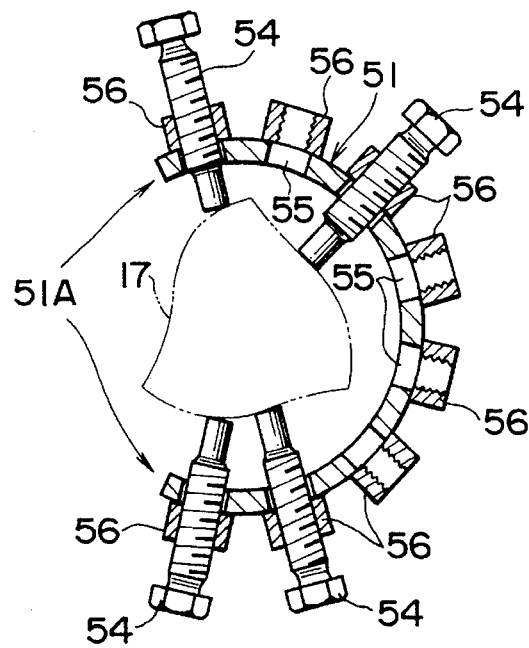
FIG. 14 is an enlarged view of the cross-section marked D—D in FIG. 13.
Figure 15:
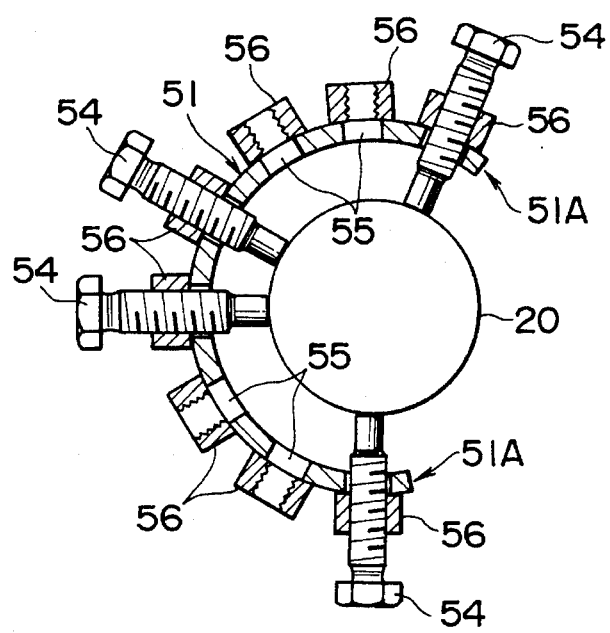
FIG. 15 is an enlarged view of the cross-section marked E—E in FIG. 13.

FIGS. 11 and 12 show a fourth embodiment of the present invention. This embodiment differs from the previously described embodiments in the nature of the engagement of the rotor segments to the rotor shaft. On the rotor tip-side radial face of flange 15F are formed a plurality of holes 65 (pin holes). Corresponding holes 66, 67 are also formed on each radial face of each rotor segment 16–20. Connecting members 68 (connecting pins) are inserted within each pair of corresponding holes 65, 66, 67 to thereby transmit the rotational torque of rotor shaft 15 to the rotor segments 16–20.

With this fourth embodiment, the rotor shaft 15G onto which the segments are fitted has a circular cross-section of larger effective radius than the splined shaft 15A adopted in the previous embodiments, thereby increasing the strength of the shaft. The shaft bears the most load, but in the case of the shaft of this embodiment, it is sufficient to consider only the bending stress, without any need to consider the stress concentration. Accordingly, high torque mixing can be realised; the shaft can be lengthened in accordance with the increase in radius; the structure is simplified; maintenance of the shaft such as machining and cleaning is greatly simplified; and the cost is reduced. Also, by applying the engaging mechanism of this fourth embodiment to the mixer of the third embodiment, the operation of removing the rotor segments can be facilitated.

The connecting member 68 can be made to be an integral part of the rotor segment in the form of a protrusion from the rotor base-side radial face of the rotor segment, or it can be a separate member securely anchored into holes provided in the radial face of the rotor segments. Also, the holes 65, 66, 67 can be made to have a key groove shape in which case the connecting member is made to be a key or a key-shaped protrusion.

FIGS. 13–16 show a tool used for the removal of rotor segments of a mixer according to the present invention. It comprises a pair of rotor segment support units which can be made by cutting away an axial length of a portion of the surface of a cylindrical member to leave a member having an approximately C-shaped cross-section; support legs 52 mounted at each axial end of each support unit 51; a hydraulic cylinder 53 attached to one axial end of each support unit 51 and constituting rotor shaft pushing means; several segment fixing bolts 54 screwed through the body of each support unit at regular intervals in the axial direction, and at intervals of 30° in the circumferential direction.

The circumferential mouth opening 51A of each support unit is of a size sufficient to permit the insertion of rotor segments 16–20 there through into the interior of the support unit. Bolt holes 55 are formed in the body of each support unit at regular intervals in the axial direction and at intervals of 30° in the circumferential direction. A female screw member 56 (eg. nut) is mounted co-axially around each bolt hole 55 on the outer circumferential surface of each support unit 51. Bolts 54 are screwed into these female screw members 56.

In the Figures, 57 denotes a handle, and 58 denotes a reinforcing fib. Hydraulic cylinder 53 is secured to support unit 51 via mounting plate 60, in such a manner that the piston rod 59 thereof can be extended into the interior of the support unit 51. 61 denotes piping for supplying working fluid to the hydraulic cylinder 53.

Figure 16:
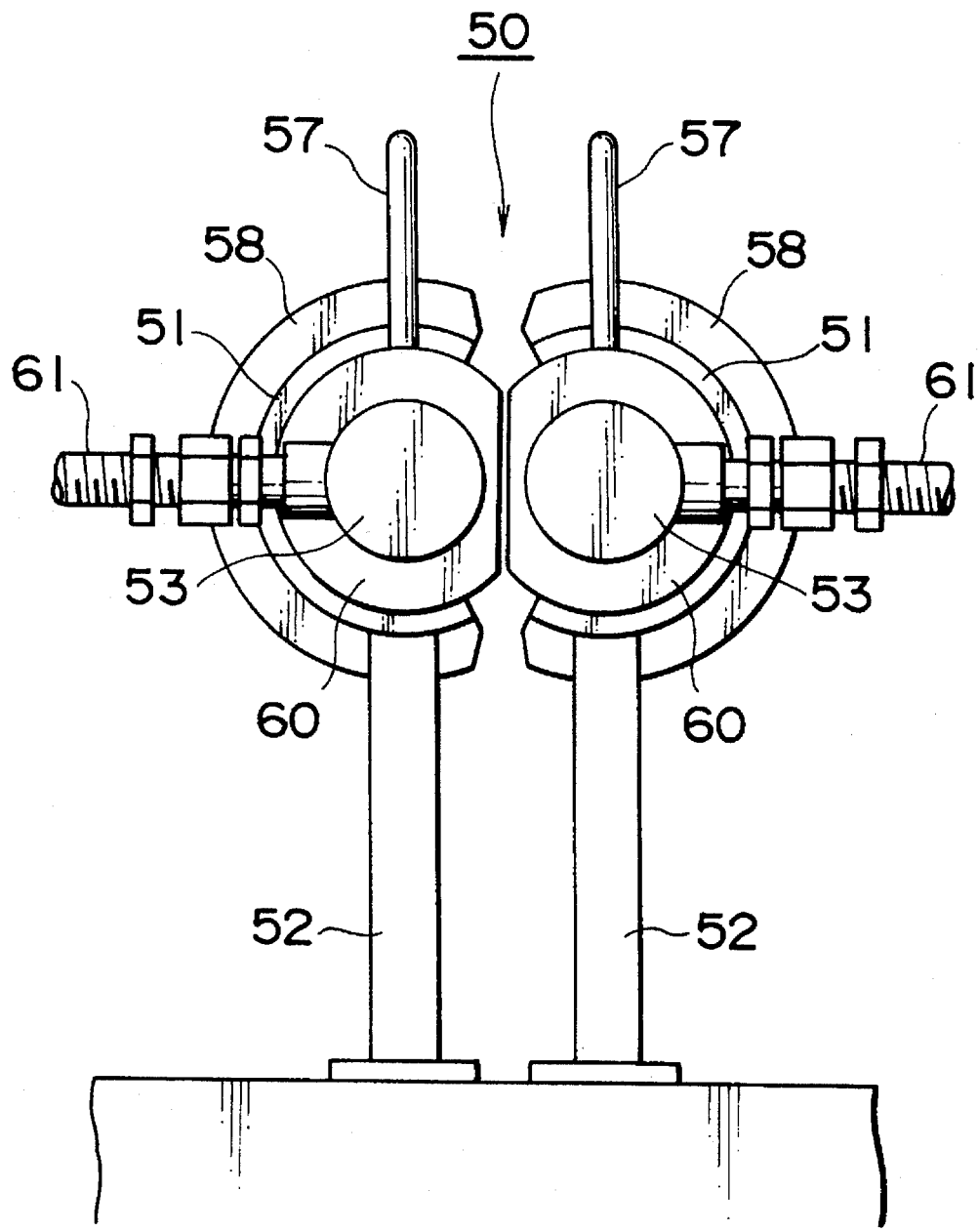
FIG. 16 is a side view of the rotor segment removal tool shown in FIG. 13.
Figure 17:
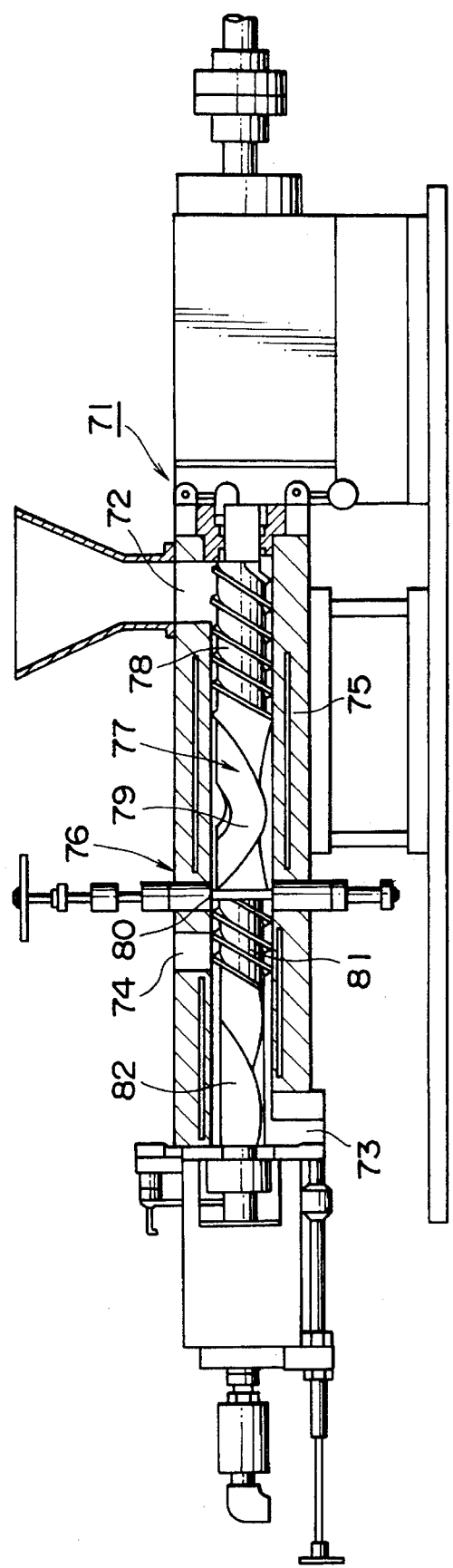
FIG. 17 is a cut away view of a conventional mixer.

When the segment removal tool 50 is to be used for the dismantling of rotors and replacement of rotor segments of mixers of the type in which each rotor is supported at both ends, firstly, the locking member 30 is loosened, and gates 21, 22 are opened using opening drive means 38. The barrel 5 is then axially displaced in a direction away from the base of the rotors to leave rotors 7 in an exposed condition as shown in FIG. 7. Then as shown in FIG. 16, the two halves of the segment removal tool are symmetrically fitted around the rotors from the side, and the rotor tip-side of segment 20 is secured using the corresponding segment securing bolt 54, to secure it to the support unit 51.

Then, if the end of piston rod 59 is pushed against the end of rotor shaft 15 and extended the length of one stroke, the segment 20 is pushed in the direction of the tip of the rotor shaft 15 through the securing action of segment securing bolt 54, whereby the segment 20 is axially displaced together with the support unit 51 in the direction of the tip of the rotor shift by a distance corresponding to the length of one stroke, to effect the removal of segment 20.

The same procedure is repeated step-by-step along the length of the rotor towards the base portion of the rotor, in order to remove all the rotor segments from the rotor shaft 15.

Using the above-described segment removal tool according to the present invention, it is sufficient to expose the rotors from within the barrel without any need to detach the base portion 15B of the rotor shaft 15 from the drive mechanism, and the operation of dismantling the rotors and replacing/cleaning the rotor segments can be effected easily, effectively and in a short period of time.

The scope of present invention is not limited to the embodiments described above. For example, the gate opening drive means can be electrically powered; a mechanical seal consisting of a series of piston rings can be adopted in addition to the Viscoseal; and the shaft sleeve can be combined with the rotor segment to form a single integrated unit, to name but a few of the many possible design alterations all within the scope of the present invention. The present invention can also be applied to the type of mixer which has no vent hole provided.

What is claimed is:

1. A continuous mixer comprising:

a barrel having a feed orifice at one end and a discharge orifice at the other end; and a pair of rotors parallely mounted for rotation inside said barrel;

wherein each of said rotors comprises a rotor shaft, and a plurality of rotor segments fitted onto said rotor shaft, wherein the rotor segment closest to the base portion of the rotor shaft is engaged with said rotor shaft, and neighboring segments are engaged with each other, through the engagement of projections protruding from the radial surface of one and matching holes formed on the radial surface of the other.

2. A continuous mixer comprising:

a barrel having a feed orifice at one end and a discharge orifice at the other end; and a pair of rotors parallely mounted for rotation inside said barrel;

wherein each of said rotors comprises a rotor shaft, and a plurality of rotor segments fitted onto said rotor shaft, wherein a male screw is formed on the circumferential surface of the base portion of said rotor shaft adjacent to that portion of the surface upon which the first rotor segment is fitted; and a nut is screwed onto said male screw and contacts the radial surface of said first rotor segment.

3. A continuous mixer comprising:

a barrel having a feed orifice at one end and a discharge orifice at the other end; and a pair of rotors parallely mounted for rotation inside said barrel;

wherein each of said rotors comprises a rotor shaft, and a plurality of rotor segments fitted onto said rotor shaft, wherein at least one of said rotor segments fitted onto said rotor shaft is a mixing segment; a gate segment is fitted onto said rotor shaft immediately after said mixing segment; and a gate is positioned around said gate segment.

4. The continuous mixer according to claim 1 or 2 or 3 wherein said rotor shaft has splines extending in the axial direction formed on the outer circumferential surface thereof, and said rotor segments have grooves formed on the circumferential inner surface thereof to engage with said splines.

5. The continuous mixer according to any of claims 1 or 2 further comprising:

a water end stop positioned at the end of said barrel and having a seal chamber through which said rotor shaft passes;

a seal sleeve fitted onto the portion of said rotor shaft passing through said seal chamber, wherein one portion of the inner circumferential surface of said seal sleeve engages with the outer surface of said rotor shaft and a second portion of the inner circumferential surface of said seal sleeve is separated by a certain distance from the outer surface of the rotor shaft;

a male screw formed on the portion of the outer circumferential surface of said rotor shaft separated by a certain distance from said seal sleeve; and a member having an internal screw thread screw fitted onto said male screw in the space between the inner circumferential surface of said seal sleeve and the outer circumferential surface of said rotor shaft.

6. The continuous mixer according to any of claims 1 or 2 or 3 further comprising a seal mechanism formed between neighbouring rotor segments.

7. The continuous mixer according to claim 3 wherein a passage formed by said gate segment and said gate has a ring shaped cross-section of uniform radial width.

* * * * *